(12) United States Patent
Harasawa et al.

(10) Patent No.: US 6,652,301 B2
(45) Date of Patent: Nov. 25, 2003

(54) EJECTOR MECHANISM FOR CARD CONNECTOR

(75) Inventors: Masaaki Harasawa, Yokohama (JP); Yozo Tomonari, Yokohama (JP)

(73) Assignee: J.S.T. Mfg. Co., Ltd., Osaka (JP)

( * ) Notice: Subject to any disclaimer, the term of this patent is extended or adjusted under 35 U.S.C. 154(b) by 0 days.

(21) Appl. No.: 10/324,146

(22) Filed: Dec. 20, 2002

(65) Prior Publication Data

US 2003/0124890 A1 Jul. 3, 2003

(30) Foreign Application Priority Data

Dec. 28, 2001 (JP) ........................................ 2001-401248

(51) Int. Cl.[7] .............................................. H01R 13/62
(52) U.S. Cl. ......................................................... 439/159
(58) Field of Search ................................. 439/152, 155, 439/159, 160

(56) References Cited

U.S. PATENT DOCUMENTS 6,123,560 A * 9/2000 Hara et al. .................. 439/159
6,520,784 B2 * 2/2003 Ito et al. ..................... 439/159

FOREIGN PATENT DOCUMENTS

| JP | 10312854 A | * 11/1998 | ........... H01R/13/64 |
| JP | 11-86966 | 3/1999 | |
| JP | 11297416 A | * 10/1999 | ......... H01R/13/633 |

* cited by examiner

Primary Examiner—Tho D. Ta
Assistant Examiner—James R. Harvey
(74) Attorney, Agent, or Firm—Rader, Fishman & Grauer PLLC

(57) ABSTRACT

Providing an ejector mechanism for card connector which is of a type wherein a transmission pin retained by a drive member is circulated in a heart-shaped cam groove along a predetermined circulating direction in conjunction with reciprocal movement of a push rod. A resilient cantilever arm has its fixed end secured to the drive member. A free end of the cantilever arm defines a bent projection, which is provided with the transmission pin. The cantilever arm utilizes its own resilience for urging the transmission pin against a bottom of the cam groove.

8 Claims, 10 Drawing Sheets

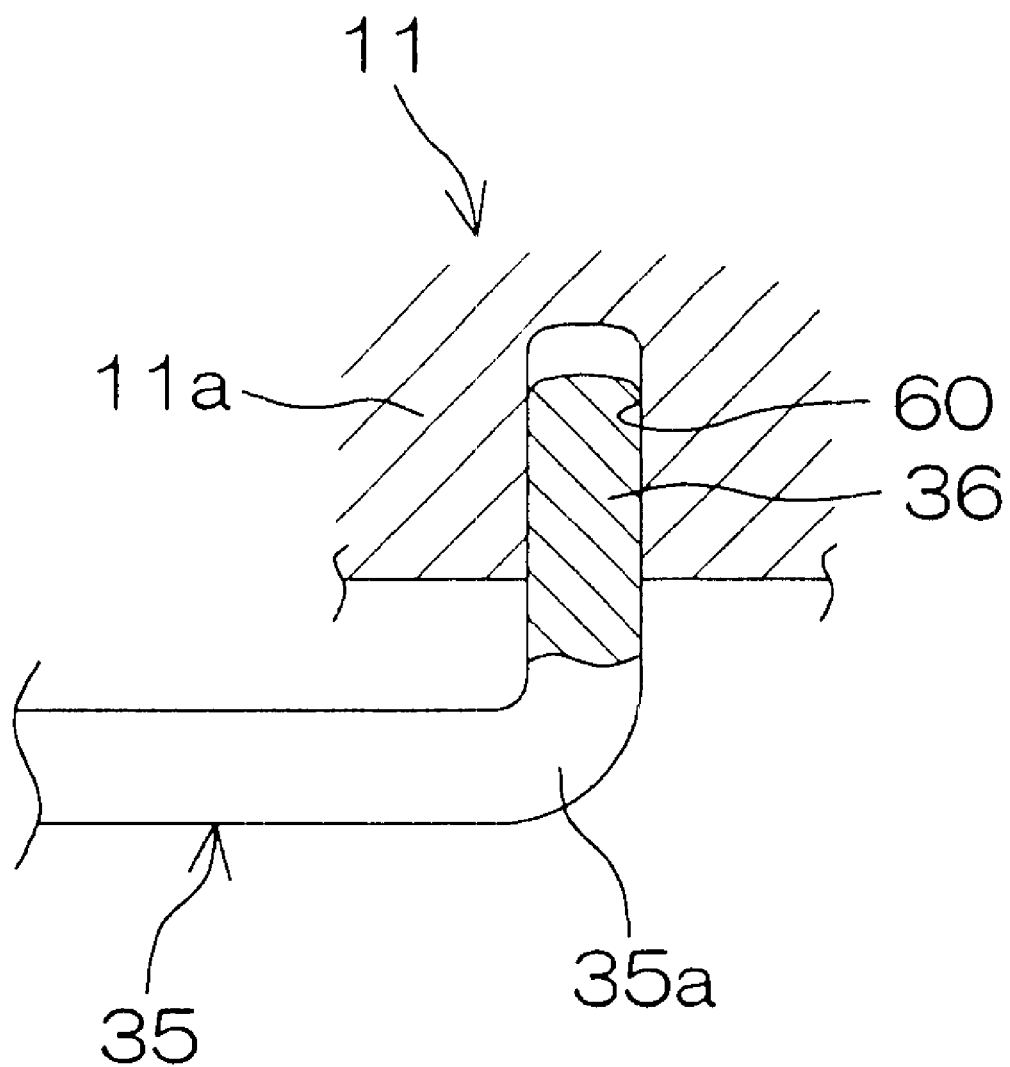

EJECTOR MECHANISM FOR CARD CONNECTOR

CROSS REFERENCE TO RELATED APPLICATION

This application claims the benefit under 35 U.S.C.§119 of Japanese Patent Application No. 2001-401248, the abstract of disclosure of which is incorporated herein by reference.

BACKGROUND OF THE INVENTION

1. Field of the Invention

The present invention relates to an ejector mechanism for card connector, which is mounted to a card connector for electrical card, such as an IC card or the like, and operative to eject a card loaded in the connector.

2. Description of Related Arts

The ejector mechanism of this type operates as follows. When a push rod is pressed when an IC card is loaded in the connector, an eject arm is rotated in association with the manipulated push rod so that a claw portion of the eject arm pushes the IC card toward front, thereby allowing the IC card to be readily extracted as held between fingers.

However, the push rod is projected toward front when the IC card is loaded and hence, a fear exists that the projected push rod may be inadvertently manipulated to eject the connected IC card which is not to be ejected.

As a solution, there has been proposed an ejector mechanism for card connector which comprises a frame formed with a heart-shaped cam groove having a lock portion; a push rod manipulated to eject an electrical card loaded in the connector; urging means for urging the push rod in its returning direction; a drive member engaged with the push rod to be reciprocated along the frame in conjunction with the reciprocal movement of the push rod; and a transmission pin retained by the drive member and circulated in the cam groove along one direction in conjunction with the reciprocal movement of the push rod (see, for example, Japanese Unexamined Patent Publication No. 11 (1999)-86966).

According to the ejector mechanism, when the electrical card is not loaded, the urging means holds the transmission pin in engagement with the lock portion of the cam groove, thereby maintaining the push rod in a pressed position. When the electrical card is loaded, the transmission pin is moved along the circulating direction of the heart-shaped cam groove for allowing the push rod to move from the pressed position to a projected position. While the push rod is moved from the projected position to a pressed position, the drive member operates to rotate the eject arm thereby ejecting the electrical card.

The transmission pin is pivotally supported by the frame. The pivotal transmission pin is urged against a bottom of the cam groove by means of a leaf spring.

Unfortunately, the transmission pin and the leaf spring for urging the pin are independent components, which not only require a cumbersome assembly work but also lead to unstable operations of the mechanism. Furthermore, because of a great number of components, the ejector mechanism has increased costs of components and assembly work, resulting in increased fabrication costs. In addition, the ejector mechanism has a large size.

In view of the foregoing, it is an object of the invention to provide an ejector mechanism for card connector, which contributes to the reduction of cost and space and also ensures reliable operations.

SUMMARY OF THE INVENTION

In accordance with a preferred aspect of the invention for achieving the above object, an ejector mechanism for card connector for ejecting an electrical card loaded in a connector comprises a frame formed with a heart-shaped cam groove having a lock portion; a reciprocally movable push rod manipulated to eject the electrical card loaded in the connector; urging means for urging the push rod in its returning direction; a drive member engaged with the push rod to be reciprocated along the frame in conjunction with a reciprocal movement of the push rod; a transmission pin retained by the drive member and circulated in the cam groove along a predetermined circulating direction in conjunction with the reciprocal movement of the push rod; and a resilient cantilever arm having a fixed end and a free end. The fixed end of the cantilever arm is secured to the drive member whereas the free end thereof defines a bent projection, which defines the transmission pin. The cantilever arm utilizes its own resilience for urging the transmission pin against a bottom of the cam groove.

According to the embodiment, the cantilever arm has its fixed end secured to the drive member while utilizing its own resilience for urging the transmission pin constituting a part thereof. As compared with the conventional mechanism wherein the transmission pin and the leaf spring for urging the pin are separate components, the embodiment is decreased in fabrication costs because of the smaller numbers of components and assembly steps. The embodiment further contributes to downsizing. Furthermore, since the cantilever arm has its fixed end secured to the drive member, the transmission pin is allowed to operate in a very stable manner. As a result, the ejector mechanism can ensure reliable operations.

BRIEF DESCRIPTION OF THE DRAWINGS

FIG. 6 is a sectional view showing a fixed end of a cantilever arm and a principal part of the drive member;

DETAILED DESCRIPTION OF THE PREFERRED EMBODIMENT

A preferred embodiment of the invention will be described with reference to the accompanying drawings.

Figure 1:
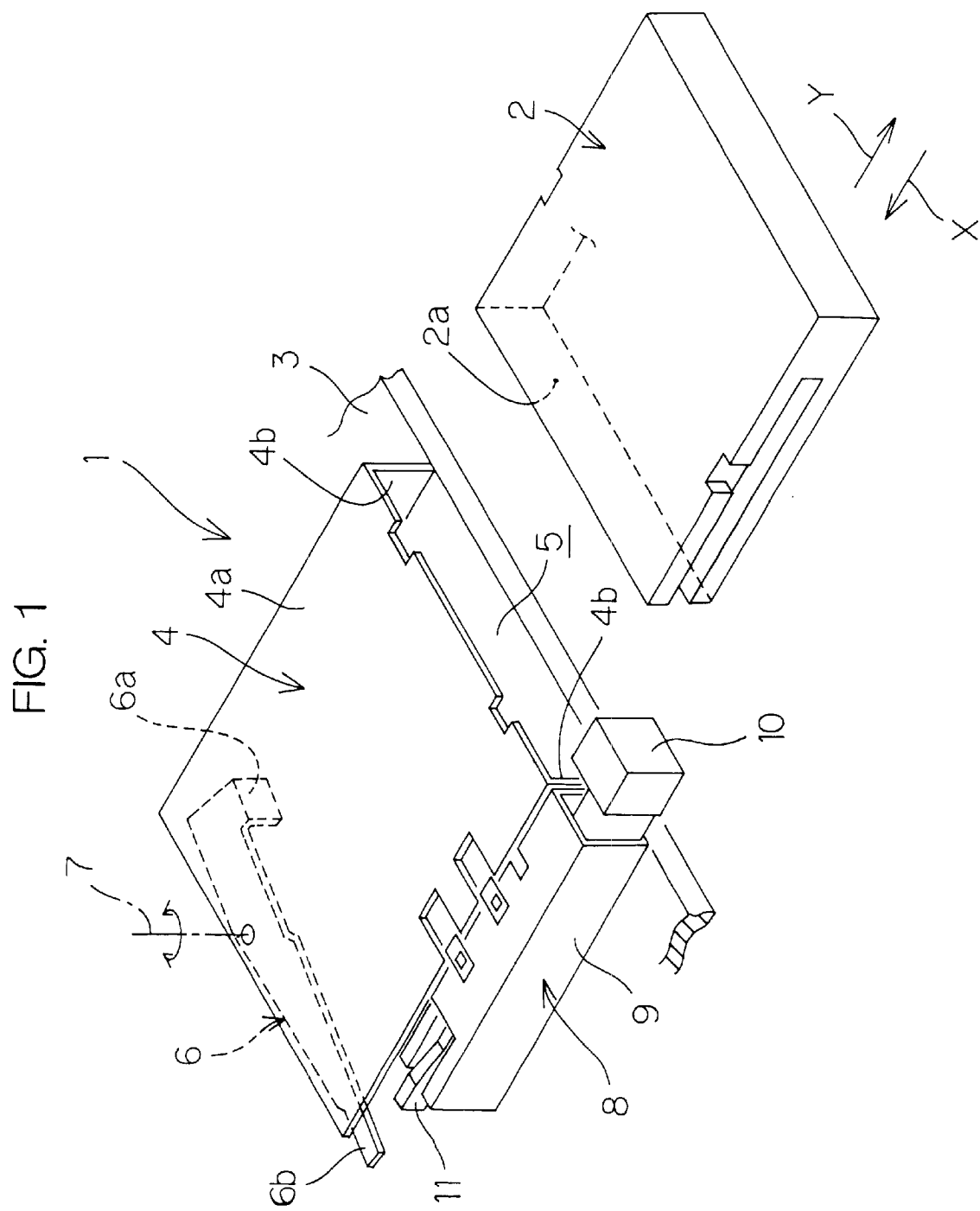
FIG. 1 is a disassembled perspective view showing a card connector with an ejector mechanism according to one embodiment of the invention and an electrical card.

FIG. 1 is a disassembled perspective view showing a card connector with an ejector mechanism according to one embodiment of the invention, and an electrical card. Referring to FIG. 1, a card connector 1 is a connector for mounting an electrical card 2, such as an IC card, and comprises a board 3 and a frame body 4 formed of a metal sheet shaped like a groove. Although depiction is obviated, the electrical card 2 is formed with a plurality of socket contacts on an insertion-side end face 2a as a connection face thereof. On the other hand, the board 3 is provided with a pin housing thereon, which is formed from an insulative synthetic resin. The pin housing has a plurality of pin contacts fixedly pressed therein for connection with the socket contacts of the electrical card 2.

In the connector 1, the frame body 4 and the board 3 define an insertion space 5 in which the electrical card 2 is inserted along an insertion direction X. The pin housing is disposed at a rear portion of the insertion space 5. Also disposed at the rear portion of the insertion space 5 is an eject arm 6 which operates to push the insertion-side end face 2a of the electrical card 2 inserted in the insertion space 5 thereby ejecting the electrical card 2 from the insertion space 5 along an ejection direction Y.

The eject arm 6 is pivotally supported by an axis 7 disposed on an upper plate 4a of the frame body 4, thus allowed to rotate about the axis 7 along a lower surface of the upper plate 4a. The eject arm 6 defines a first engagement portion 6a at one end thereof for engagement with the insertion-side end face 2a of the electrical card 2, while defining a second engagement portion 6b at the other end thereof for engagement with a drive member 11 of an ejector mechanism 8. The ejector mechanism 8 is disposed on a side of the frame body 4 and operates to eject the inserted electrical card 2 from the insertion space 5.

Figure 2A:
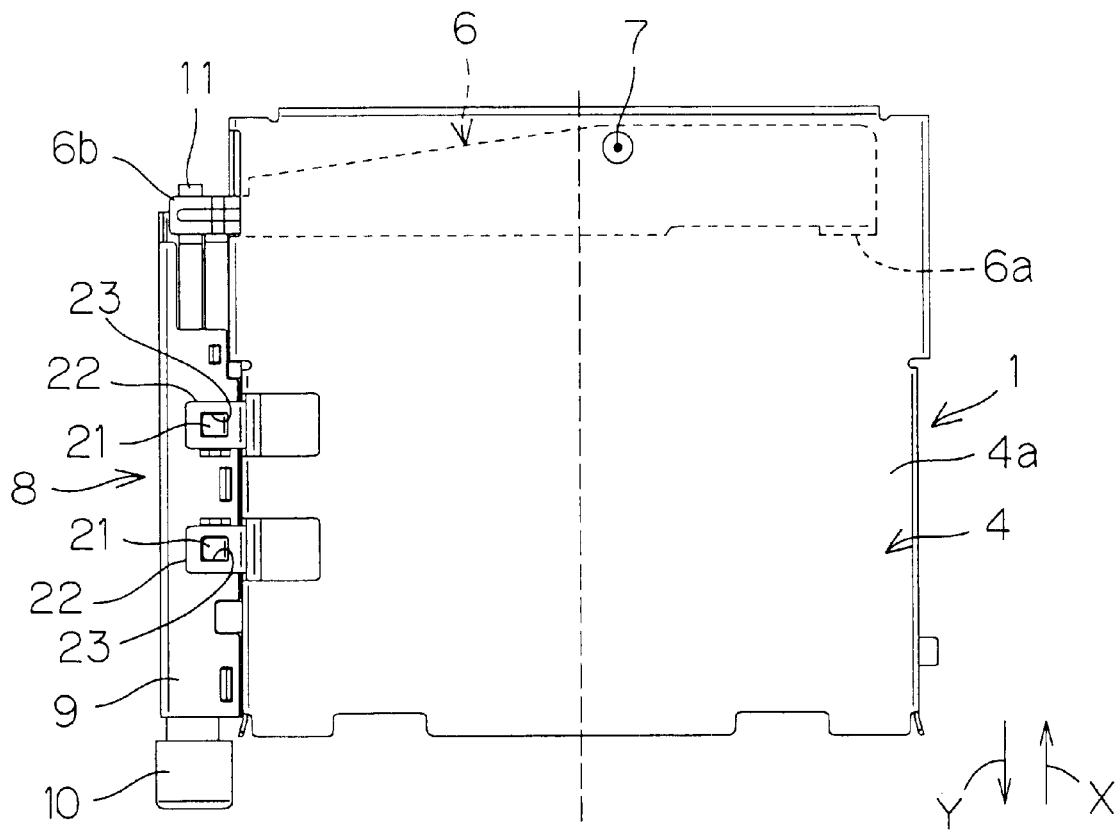
FIGS. 2A and 2B are a plan view and a front view each showing the card connector with a board removed therefrom.
Figure 2B:
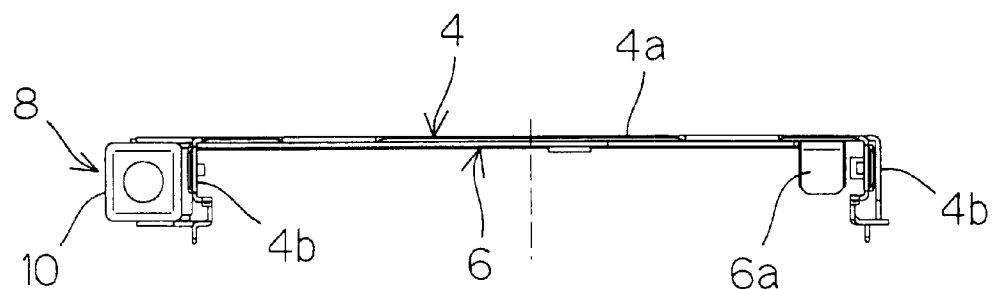

Referring to FIG. 1 and FIGS. 2A and 2B showing the connector 1 in plan view and front view, respectively, the ejector mechanism 8 essentially comprises a frame 9 attached to a side plate 4b of the frame body 4; a push rod 10 reciprocally movably supported by the frame 9 and manipulated to eject the electrical card; and the drive member 11 adapted to reciprocate along the frame 9 in conjunction with the reciprocal movement of the push rod 10.

The ejector mechanism 8 will be described in more details with reference to FIGS. 3, 4, 5, 7A and 7B.

Figure 3:
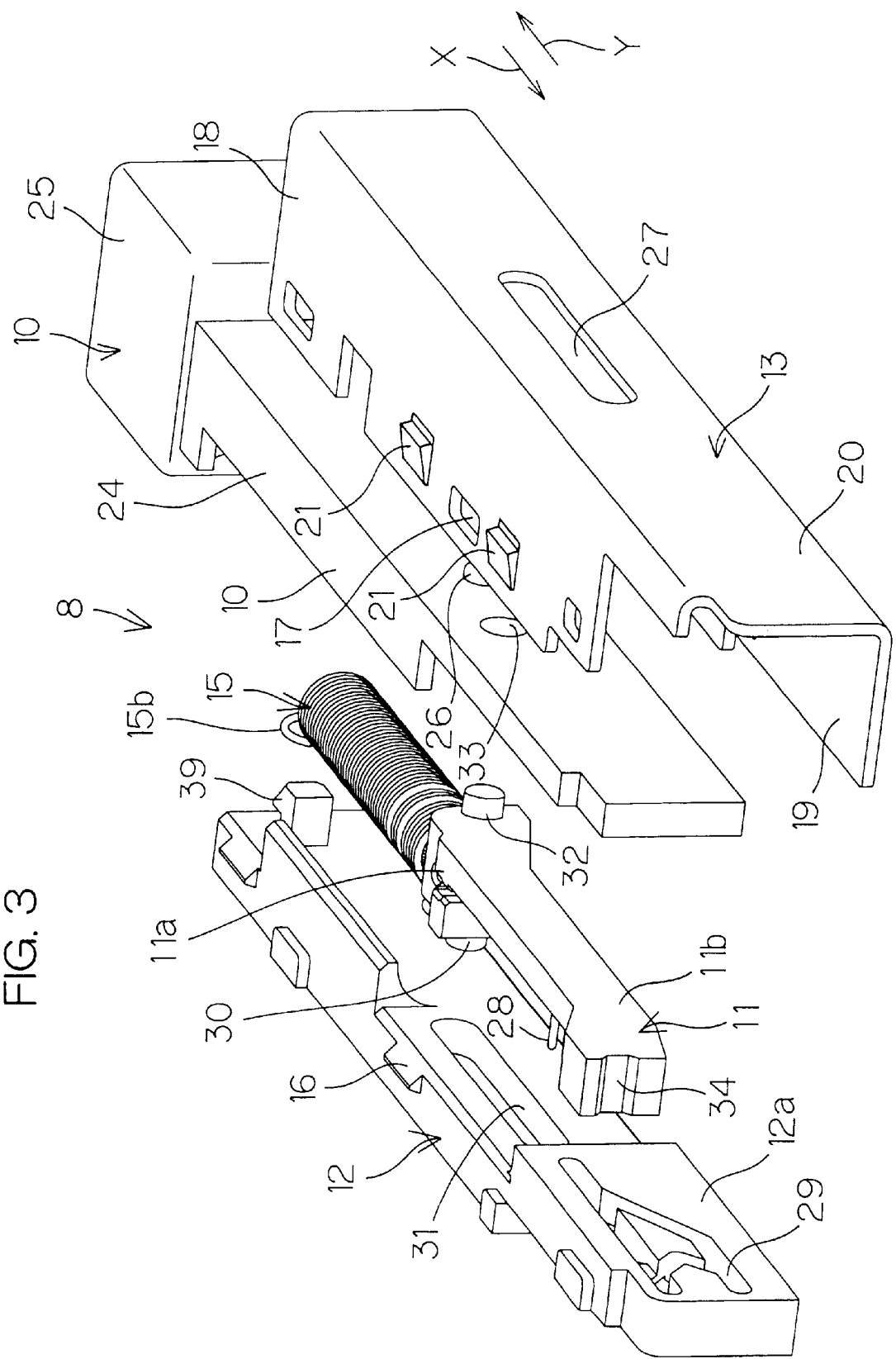
FIG. 3 is a disassembled perspective view showing the ejector mechanism.
Figure 4:
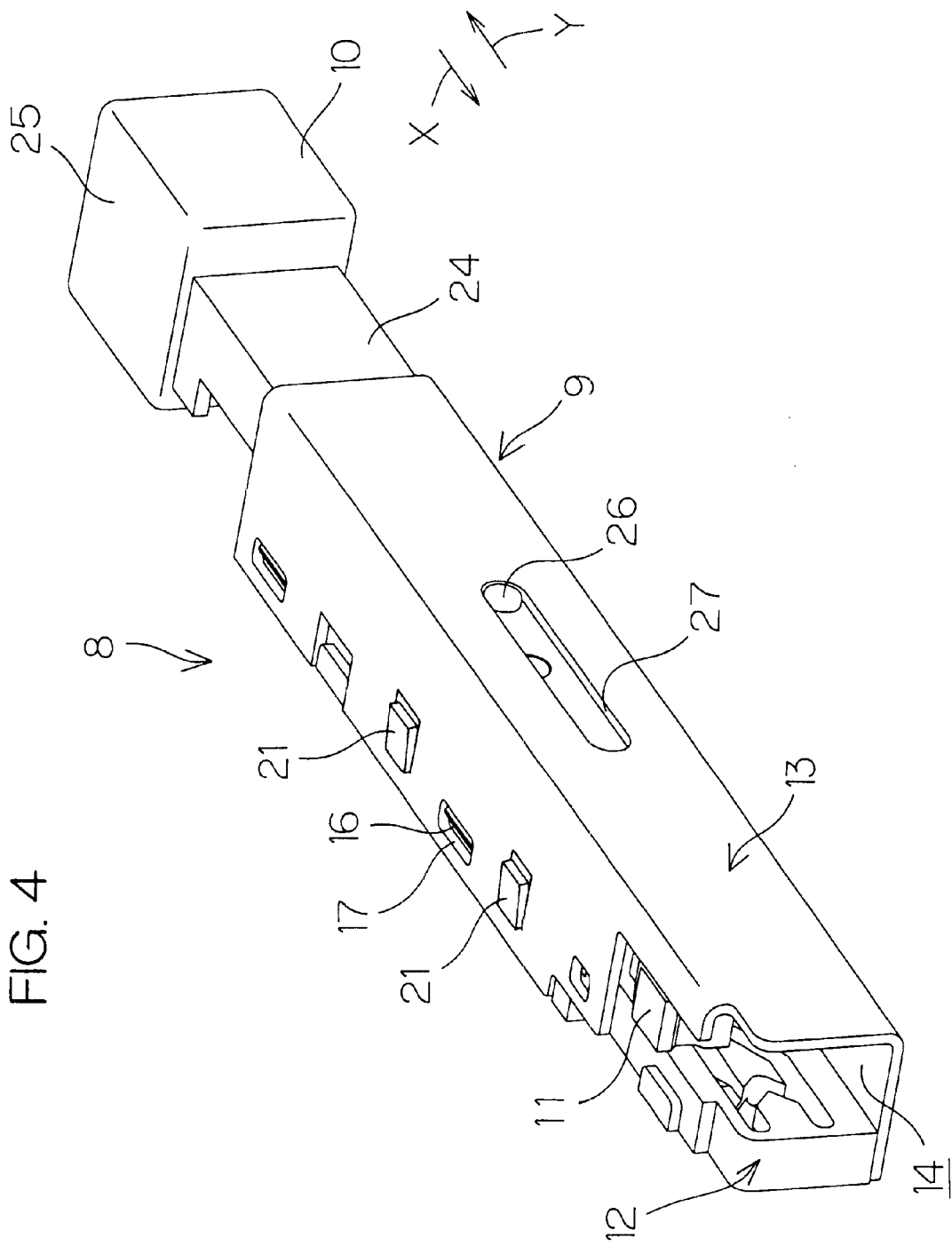
FIG. 4 is an assembled perspective view showing the ejector mechanism.

Referring to a disassembled perspective view of FIG. 3 and an assembled view of FIG. 4, the frame 9 includes a first frame 12 formed of a synthetic resin and disposed in back-to-back relation with the side plate 4b of the frame body 4; and a second frame 13 formed of a sheet metal substantially of a groove shape. An accommodating cavity 14, defined by the first and second frames 12, 13 (see FIGS. 4 and 7A), accommodates therein a part of the push rod 10, the drive member 11 and a tension coil spring 15 as urging means.

In FIG. 3, the first and second frames 12, 13 are securely connected together by way of engagement between engaging projections 16 (only one of them is shown in FIG. 3) formed at an upper and an lower places of the first frame 12 and corresponding engaged holes 17 of the second frame 13.

The second frame 13 includes an upper plate 18, a lower plate 19 and a side plate 20. The aforethe engaged holes 17 are formed in the upper plate 18 and the lower plate 19. The upper plate 18 and the lower plate 19 are each formed with a pair of cut-and-raised portions 21 (FIG. 3 depicts only the cut-and-raised portions 21 of the upper plate 18). As shown in FIG. 2A, the cut-and-raised portions 21 engage with corresponding engaged holes 23 in bent edges 22 thereby mounting the ejector mechanism 8 as a unit to the frame body 4 of the connector 1. The bent edges 22 are each bent outwardly at an upper or lower edge of the side plate 4b of the frame body 4 to form squareness.

Referring to FIGS. 3 and 4, the push rod 10 includes an elongate rod 24 reciprocally movable along the second frame 13, and a block-like manipulating portion 25 disposed at a front end of the rod 24 so as to be pushed by finger. A projection 26 formed on the rod 24 is guided in a guide groove 27 of the second frame 13 thereby allowing the push rod 10 to reciprocate smoothly.

Figure 7A:
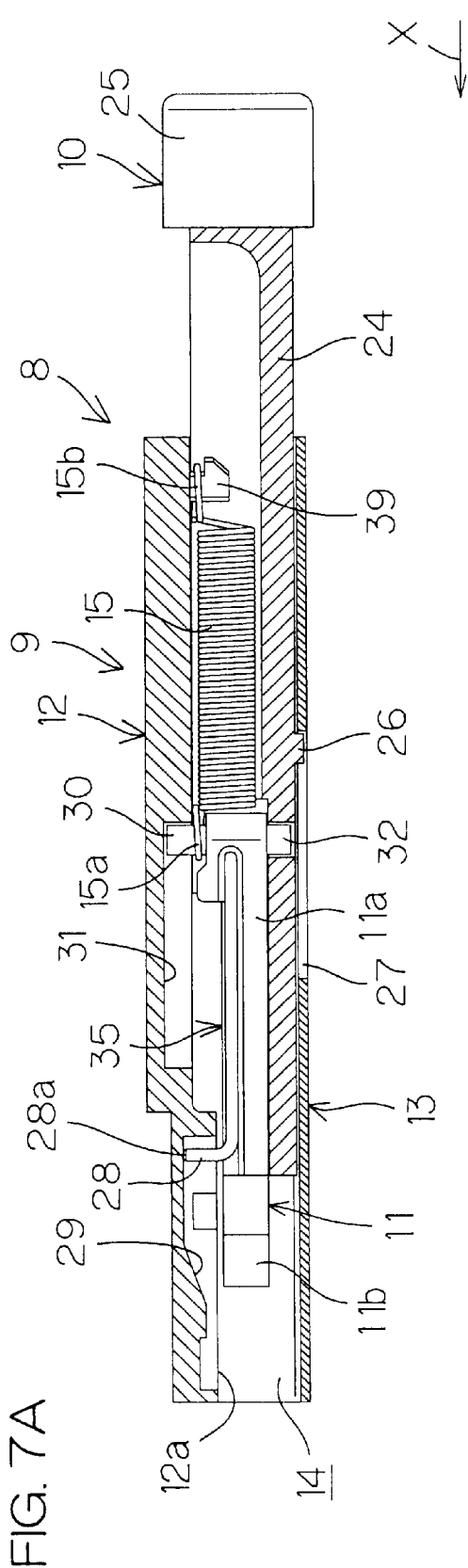
FIGS. 7A and 7B are a partly-broken front view and partly-broken side view each showing the ejector mechanism.
Figure 7B:
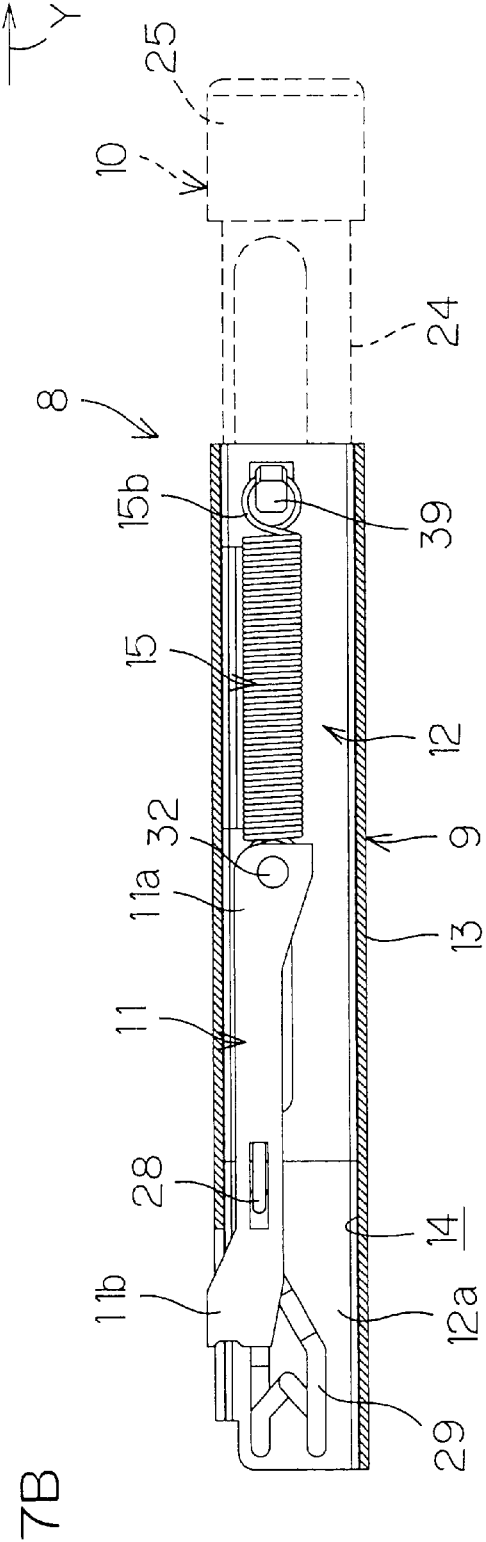

Referring to FIGS. 3 and 7B, an inside surface 12a of the first frame 12 is formed with a heart-shaped cam groove 29 engaged with a transmission pin 28, and a guide groove 31 extended in parallel with the insertion direction X (or a reciprocal movement direction of the push rod 10) for guiding a projection 30 of the drive member 11. As retained by the drive member 11, the transmission pin 28 is adapted to circulate in the cam groove 29 in a predetermined circulating direction (see FIG. 8A) in conjunction with the reciprocal movement of the push rod 10.

Referring to FIGS. 3, 5, 7A and 7B, formed at a first end 11a of the drive member 11 are the aforethe projection 30 and a projection 32 coaxially projecting in the opposite direction from the projection 30. The projection 32 engages with a coupling hole 33 formed longitudinal center of the rod 24 of the push rod 10. Thus, the drive member 11 is supported as allowed to pivot about the projections 30 and 32.

Figure 5:
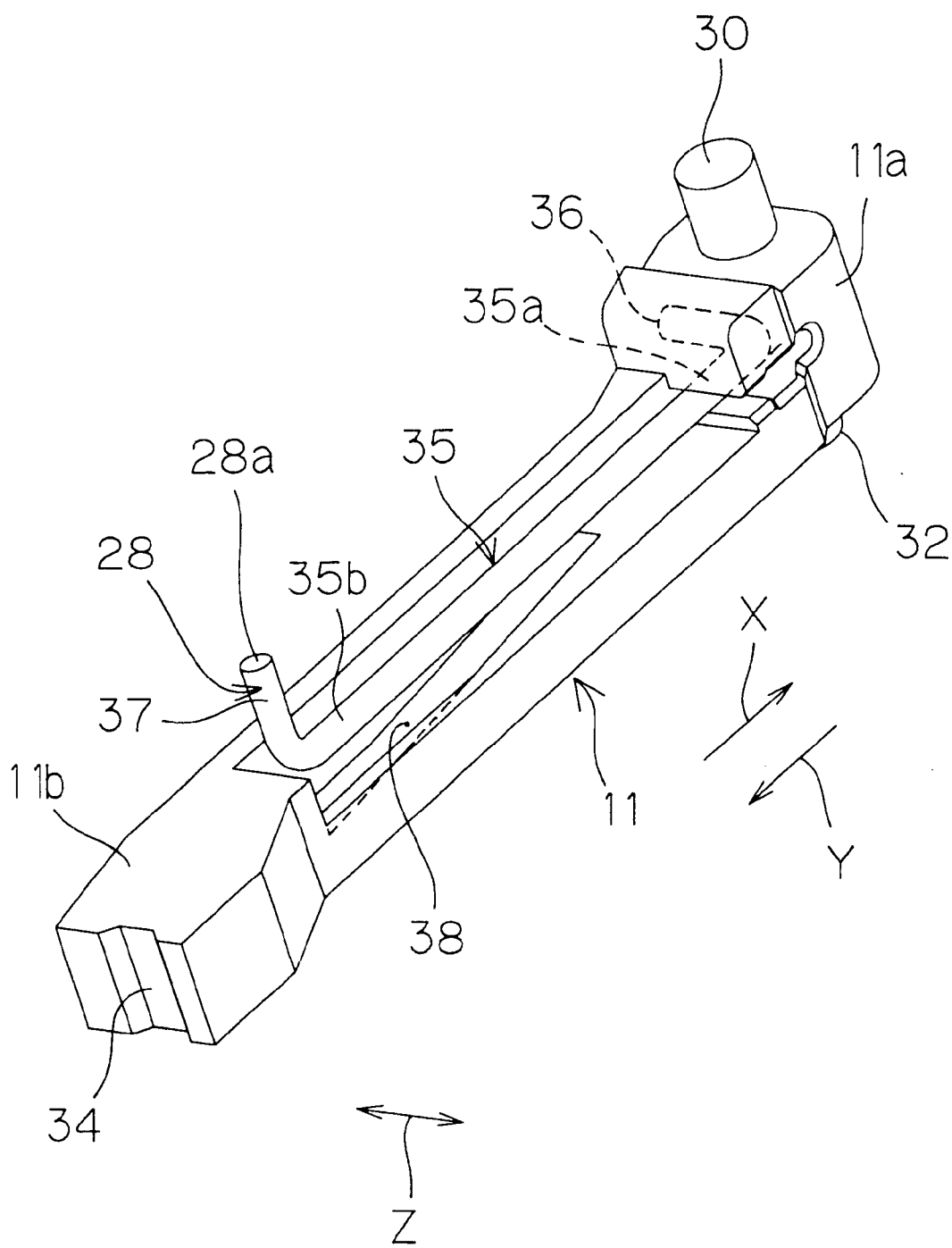
FIG. 5 is a perspective view showing a drive member with a transmission pin attached thereto.

Referring to FIGS. 3 and 5, the drive member 11 is formed with an engagement portion 34 at a second end 11b thereof, such that the engagement portion 34 comes into engagement with the second engagement portion 6b of the eject arm 6 so as to push the same when the electrical card 2 is ejected. The engagement portion 34 is, for example, in the form of a groove such as to ensure the engagement with the second engagement portion 6b.

Referring to FIGS. 5 and 7A, the transmission pin 28 is defined by a part of a resilient metal cantilever wire 35 as a cantilever arm retained by the drive member 11. Specifically, the cantilever wire 35 has a fixed end 35a thereof secured at place near the first end 11a of the drive member 11, and a free end 35b thereof located near the second end 11b of the drive member 11. A bent projection 36 formed at the fixed end 35a is fixedly pressed in a corresponding fixing hole 60 (see FIG. 6) of the drive member 11. On the other hand, the transmission pin 28 is defined by a bent projection 37 formed at the free end 35b of the cantilever wire 35. The cantilever wire 35 is designed to utilize its own resilience for urging the transmission pin 28, constituting a part thereof, against a bottom of the cam groove 29. Under the urging force, an operative portion 28a at a distal end of the transmission pin 28 engages the bottom of the cam groove 29 to be moved in conformity therewith.

Returning to FIG. 5, the drive member 11 also includes a guide groove 38 for guiding the free end 35b including the transmission pin 28. The guide groove 38 is progressively increased in depth toward the second end 11b. The guide groove 38 guides the free end 35b of the cantilever wire 35, which is flexed toward the drive member 11 when the transmission pin 28 is pushed by the cam groove 29. Specifically, lateral inside walls of the guide groove 38 restrict a lateral movement of the free end 35b (a Z-direction shown in FIG. 5 or a direction orthogonal to the transmission pin 28) such that the cantilever wire 35 under the flexing force is prevented from deviating in an unwanted direction. This ensures a positive ejecting operation.

Referring to FIG. 7A, the tension coil spring 15, as the urging means, has one end 15a thereof engaged with the projection 30 of the drive member 11, while referring to FIGS. 3, 7A and 7B, the other end 15b of the tension coil spring 15 is engaged with a projection 39 formed on the inside surface 12a of the first frame 12. Thus, the end 15a of the tension coil spring 15 is engaged with the projection 30 guided by the guide groove 31 of the first frame 12 and hence, the mechanism is more simplified in structure than a case where an independent projection is provided for engagement with the tension coil spring 15. Such an arrangement contributes to the size reduction of the mechanism.

The tension coil spring 15 urges the drive member 11 and the push rod 10 in their returning direction or the card ejection direction Y.

Figure 8A:
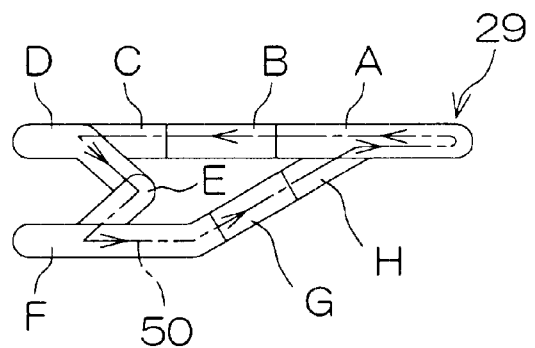
FIG. 8A is a schematic diagram showing a heart-shaped cam groove, while FIG. 8B representing a developed view showing cam surfaces of the cam groove.
Figure 8B:
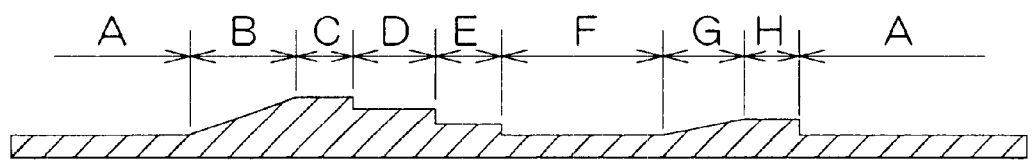

Next, the heart-shaped cam groove 29 will be described. As shown in FIGS. 8A and 8B, the cam groove 29 includes a plurality of cam surfaces A–H of different heights. In conjunction with the reciprocal movement of the push rod 10, the operative portion 28a of the transmission pin 28 is moved on these cam surfaces A–H in circulation along a predetermined circulating direction 50 (counterclockwise direction as shown in the figure).

Referring to FIG. 8B, a portion forming a bottom of a V-shaped portion of the heart-shaped cam groove 29 defines a lock portion of the cam groove 29. The cam surface E defining the lock portion is designed to be higher than the adjacent cam surface F in the circulating direction 50, but to be lower than the adjacent cam surface D in the opposite direction to the circulating direction 50.

Figure 9A:
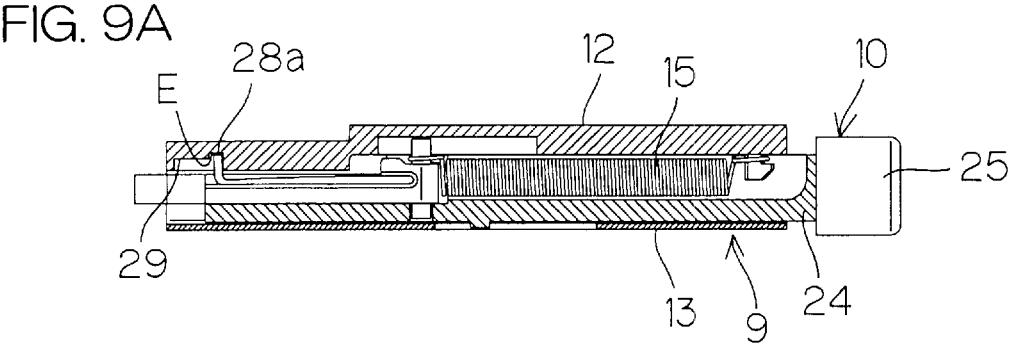
FIGS. 9A to 9D are a group of sectional views sequentially showing operations of the ejector mechanism.

Next, operations of the ejector mechanism 8 will be described with reference to FIGS. 9A to 9D. Firstly, in a state where the electrical card 2 is inserted in place, the tension coil spring 15 operates to hold the operative portion 28a of the transmission pin 28 in engagement with the cam surface E (see FIG. 8A) so that the push rod 10 is stably maintained in a pressed position, as shown in FIG. 9A.

Figure 9B:
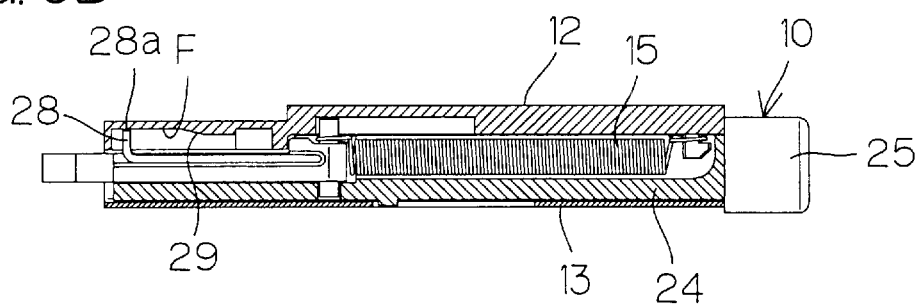
Figure 9C:
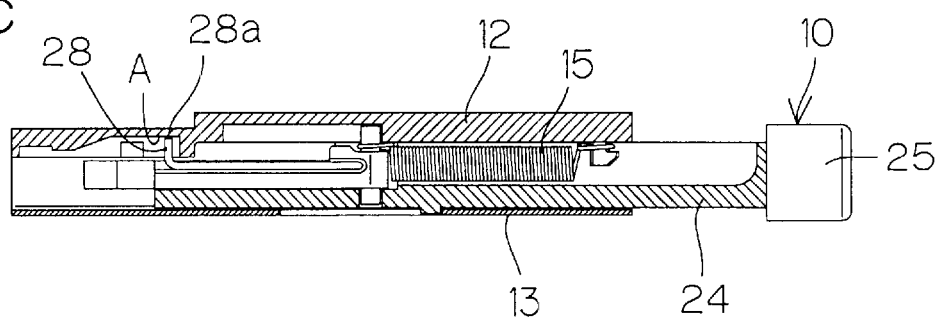

When the push rod 10 is pressed to a fully-pressed position, as shown in FIG. 9B, in order to eject the inserted electrical card 2, the operative portion 28a of the transmission pin 28 is automatically driven to the lower cam surface F (see FIG. 8A) to release the lock, so that the push rod 10 is allowed to extend in its returning direction. Hence, as shown in FIG. 9C, the tension coil spring 15 operates to move the operative portion 28a to the cam surface A via the cam surfaces G and H (see FIG. 8A), so that the push rod 10 is moved to a fully-projected position.

Figure 9D:
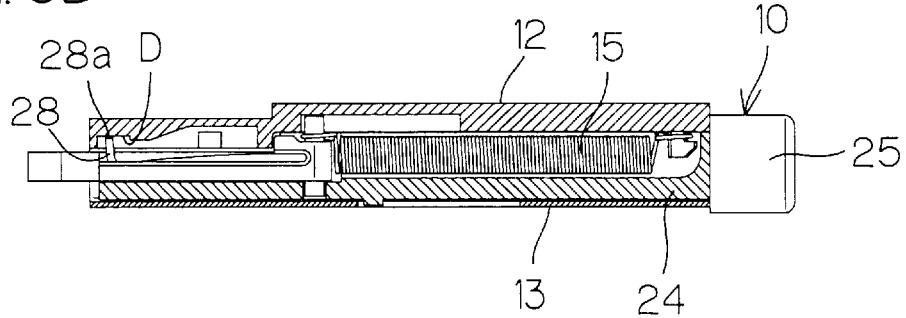

While the push rod 10 at the fully-projected position is pressed, the operative portion 28a of the transmission pin 28 is guided straight over the cam surfaces A, B and C to come into engagement with the cam surface D (see FIG. 8A), as shown in FIG. 9D. Although not shown in these figures, the engagement portion 34 of the drive member 11 pushes the second engagement portion 6b of the eject arm 6, which, in turn, rotates to eject the electrical card 2.

When finger is released from the push rod 10 in this state, the tension coil spring 15 operates to drive the operative portion 28a of the transmission pin 28 to the cam surface E so that the transmission pin is locked. Thus, the mechanism is returned to the state of FIG. 9A where the push rod 10 is maintained in the pressed position.

According to the embodiment as described above, the cantilever wire 35 has its fixed end 35a fixedly pressed in the drive member 11 while utilizing its own resilience for urging the transmission pin 28, constituting a part thereof. As compared with the conventional arrangement wherein a separate transmission pin and a leaf spring for urging the same are provided, the inventive arrangement features reduced numbers of components and assembly steps, achieving the reduction of fabrication costs and contributing to downsizing.

In particular, the cantilever wire 35 has its fixed end 35a fixedly pressed in the drive member 11 thereby allowing the transmission pin 28 to operate in a very stable manner. As a result, the ejector mechanism 8 can accomplish reliable operations.

The foregoing embodiment employs the metal cantilever wire 35 as the cantilever arm, which can achieve sufficient resilience and durability despite its small size.

Figure 10:
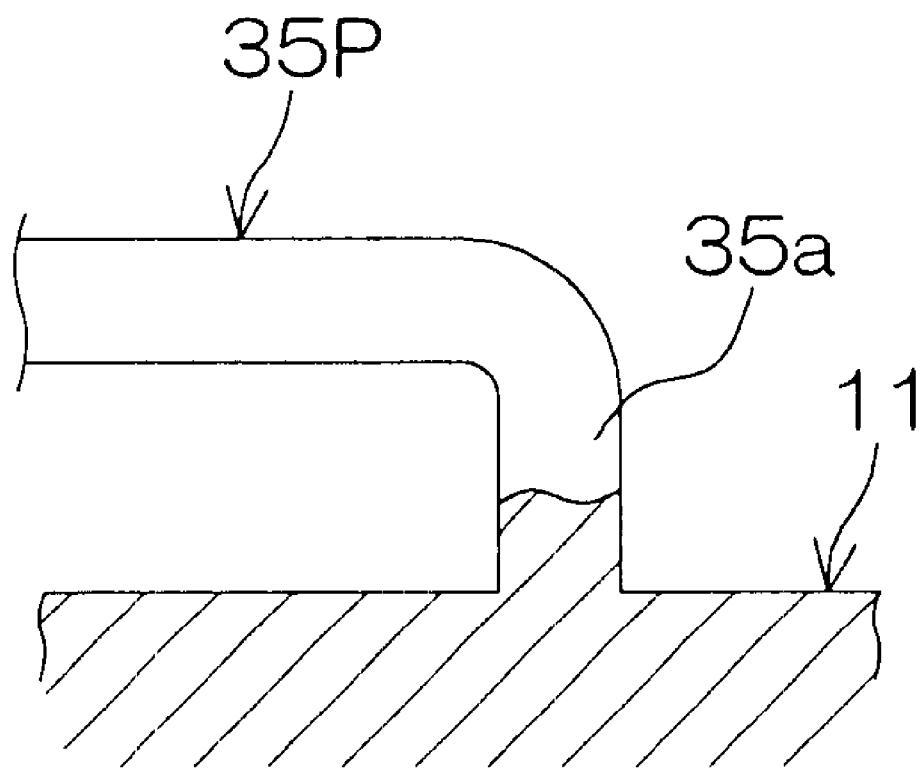
FIG. 10 is a schematic diagram showing a cantilever arm according to another embodiment of the invention.

It is to be noted that the invention is not limited to the above embodiment. For instance, the cantilever arm may be a synthetic-resin cantilever arm 35P, which is formed from a resin integrally with the drive member 11, as shown in FIG. 10. This negates the need for forming a separate member as the cantilever arm so that the fabrication costs may be decreased. Furthermore, the fixed end 35a is fixed to place more positively.

While the invention has been described in details with reference to the specific embodiments thereof, it is to be understood that changes, modifications and equivalents will be apparent to those skilled in the art who have read the foregoing description. The scope of the invention, therefore, is to be defined by the appended claims and their equivalents.

What is claimed is:

1. An ejector mechanism for card connector for ejecting an electrical card loaded in a connector, the mechanism comprising:
    a frame formed with a heart-shaped cam groove having a lock portion;
    a reciprocally movable push rod manipulated to eject the electrical card loaded in the connector;
    urging means for urging the push rod in its returning direction;
    a drive member engaged with the push rod to be reciprocated along the frame in conjunction with a reciprocal movement of the push rod;
    a transmission pin retained by the drive member and circulated in the cam groove along a predetermined circulating direction in conjunction with the reciprocal movement of the push rod; and
    a resilient cantilever arm having a fixed end and a free end,
    wherein the fixed end of the cantilever arm is secured to the drive member,
    the free end of the cantilever arm defines a bent projection,
    the bent projection defines the transmission pin, and
    the cantilever arm utilizes its own resilience for urging the transmission pin against a bottom of the cam groove.

2. An ejector mechanism for card connector according to claim 1,
    wherein when the electrical card is not loaded, the urging means holds the transmission pin in engagement with the lock portion of the cam groove thereby maintaining the push rod in a pressed position,
    when the electrical card is loaded, the transmission pin is moved along the cam groove in the predetermined circulating direction thereby allowing the push rod to move from the pressed position to a projected position, and while the push rod is moved from the projected position to a pressed position, the drive member operates to eject the electrical card.

3. An ejector mechanism for card connector according to claim 1, wherein the drive member has a guide portion for the free end of the cantilever arm, and the guide portion for the free end guides the free end of the cantilever arm when the transmission pin is pushed by the cam groove to flex the free end of the cantilever arm toward the drive member.

4. An ejector mechanism for card connector according to claim 3, wherein the guide portion for the free end includes a guide groove progressively increased in depth toward a corresponding end of the drive member.

5. An ejector mechanism for card connector according to claim 1, wherein the frame has a guide groove extended in parallel with the push rod, and the drive member includes a pair of first and second ends in opposed relation, the first end located near the fixed end of the cantilever arm and formed with a projection guided by a guide groove of the frame.

6. An ejector mechanism for card connector according to claim 5, wherein the urging means includes a tension coil spring which has one end thereof engaged with the projection.

7. An ejector mechanism for card connector according to claim 1, wherein the cantilever arm includes a metal wire having a fixed end pressed in a fixing hole of the drive member.

8. An ejector mechanism for card connector according to claim 1, wherein the cantilever arm includes a synthetic-resin arm formed from a synthetic resin integrally with the drive member.

* * * * *